United States Patent [19]

Young

[11] Patent Number: 5,092,163

[45] Date of Patent: Mar. 3, 1992

[54] PRECISION SMALL SCALE FORCE SENSOR

[76] Inventor: Russell D. Young, 852 Riverside Dr., Pasadena, Md. 21122

[21] Appl. No.: 544,666

[22] Filed: Jun. 27, 1990

[51] Int. Cl.⁵ .............................................. G01B 5/28
[52] U.S. Cl. .................................................... 73/105
[58] Field of Search .......... 73/105, 774, 704, 725–727, 73/862.64–862.67; 250/306, 307

[56] References Cited

U.S. PATENT DOCUMENTS

| | | | |
|---|---|---|---|
| 2,728,222 | 12/1955 | Becker et al. | 73/105 |
| 3,067,615 | 12/1962 | Holmes | 73/704 |
| 4,106,333 | 8/1978 | Salje et al. | 73/105 |
| 4,359,892 | 11/1982 | Schnell et al. | 73/105 |
| 4,800,274 | 1/1989 | Hansma et al. | 250/306 |
| 4,987,303 | 1/1991 | Takase et al. | 73/105 |

Primary Examiner—Robert Raevis
Attorney, Agent, or Firm—Joseph J. Zito

[57] ABSTRACT

A precision small scale force sensor utilizing a strain gauge for measurement of foces associated with small scale surface typography, minor pressure variations or other force phenomenon. A sensor or probe is connected to a thin filament of electrically conductive material whose electrical properties vary proportionate to changes in the physical dimensions of the filament. In surface topography applications, the sensor or probe is brought into close proximity with the surface to be measured, in non-contact interaction with the surface. The resultant attractive and/or repulsive forces between the probe and the surface produce deformation of the strain gauge material. Deformation of the strain gauge material results in a change in its electrical properties. The changes are monitored to determine the extent of interactive forces between the probe and the surface. By measuring the changes in the interactive forces as the probe is scanned parallel to the surface, a surface typography can be plotted. In other applications, the force is exerted on the probe which is displaced as a result. The resultant displacement is transferred to the strain filament whose resultant electrical variations are monitored.

5 Claims, 2 Drawing Sheets

PRECISION SMALL SCALE FORCE SENSOR

BACKGROUND OF THE INVENTION

The present invention relates to point force sensors. More specifically, the present invention relates to point force sensors of sufficient sensitivity and accuracy for use in atomic force microscopes, strain gauges, surface measuring devices, miniature microphones, accelerometers, and similar low force sensors.

Highly sensitive point force sensors are necessary for a number of applications wherein the force between two points must be measured with great accuracy, such as when surface typography is measured in minute detail by an atomic force microscope on the subatomic scale. A number of atomic force microscopes are currently known, for example the oscillating quartz atomic force microscope taught in U.S. Pat. No. 4,851,671 to Pohl. In Pohl, a crystal is utilized to oscillate a tip which is brought into close proximity with the surface to be measured. The deviations in the oscillating frequency, as a result of the proximity between the tip and the surface, are utilized to calculate the surface typography. A number of other devices utilize a scanning tunnelling technique for measuring surface typography by bringing a biased tip into close proximity with the surface to be measured and then using a tunnelling current to measure the deflection of the bias mounting for the scanning tip. Atomic force microscopes of this type are taught in Gimzewski, et al.; U.S. Pat. No. 4,668,865; Binning, U.S. Pat. No. 4,724,318; Hansma, et al., U.S. Pat. No. 4,800,274; and Duerig, et al., U.S. Pat. No. 4,806,755.

While each of these microscopes can be utilized to sense the typography of a surface at a subatomic level, the techniques utilized for such measurement make it difficult to adjust and/or calibrate the devices. This difficulty is significantly increased when probes are replaced, and the optics required for replacement and proper adjustment are often complex. Adjustment is especially difficult when the instrument is operated in a high vacuum, since access to the instrument is prohibited.

Surface topography measurement on a rougher scale, can also be achieved by the device taught in U.S. Pat. No. 4,200,986 to Ackerman, et al., which utilizes a probe in contact with a surface to measure surface deviations of a machine part. The probe is connected to a strain gauge which is deflected as a result of deflections of the probe tip by deviations in the sensed surface.

SUMMARY OF THE INVENTION

It is an object of the present invention to provide a sensor for utilization in an atomic force microscope which can be easily replaced and calibrated.

It is a further object of the present invention to provide a sensor tip which utilizes electronic strain gauge principles to measure the interaction between a sensor tip and a surface being scanned.

It is yet another object of the present invention to provide a sensor tip for utilization with an atomic force microscope which is mounted in a manner so that deflection of the sensor tip is limited to deflection in the direction perpendicular to the surface being scanned.

It is still another object of the present invention to provide a sensor tip mounting for a point force sensor which allows for accurate, minute measurement of surface typography with increased reliability through limiting the tip movement as a result of the surface interaction to movement perpendicular to the scanned surface.

It is still another object of the present invention to provide an atomic force sensor unit which includes a surface interacting tip and a component for detecting the force interaction between the tip and the surface, which can be readily mounted to a device for utilization of the detected information whereby the detecting element can readily supply a signal representative of the interactive force to said detecting instrument.

These and further objects of the present invention are accomplished by providing a point force sensor with a sensor tip mounted on an electrically conductive element whose electrical characteristics change during deformation. The tip is mounted to the element in a manner so that repulsive and/or attractive forces acting upon the sensor tip are transferred to the element mounting, resulting in deformation thereof.

The embodiments herein teach the construction of a precision small scale force sensor utilizing a strain or displacement sensitive material for measurement of forces, a sensor or probe is connected to a thin filament of electrically conductive material whose electrical properties vary proportionate to changes in the physical dimensions of the filament. The force exerted on the probe displaces the probe. The resultant displacement is transferred to the strain filament whose resultant electrical variations are monitored.

The filament can be a fine wire which exhibits a change in resistance corresponding to physical deformation, or a piezo electric plastic material which exhibits a voltage flow as a result of deformation.

A current is passed through the wire and the voltage drop across the wire is monitored. Changes in the voltage across the wire indicate yielding of the wire as a result of forces upon the sensor tip. Alternatively, if a piezo electric material is utilized, the voltage output of the material is monitored to detect yielding of the element. Precision typography measurements can be made by monitoring electrical fluctuations of the element resulting from the strains on the element as a result of surface interactions with the sensor tip.

Measuring changes in the electrical characteristics of the element as a result of deformation thereof eliminates the need for scanning and tunnelling currents, along with the mounting, adjustment and calibration difficulties associated with tunnelling current techniques.

BRIEF DESCRIPTION OF THE FIGURES

For a better understanding of the nature of the present invention, reference is had to the following figures and detailed description, wherein like elements are accorded like reference numerals, and wherein.

DETAILED DESCRIPTION OF EXEMPLARY EMBODIMENTS

Figure 1:
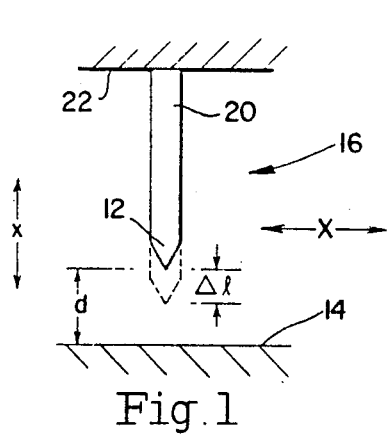
FIG. 1 is a side elevational view illustrating the relative positioning of a probe and a scanned surface.

Point force sensors are used in number of applications and in a number of ways when it is necessary to determine the force between two objects on an atomic scale. When used, for example, in an atomic force microscope, the device will include a probe 16 with a sensor tip 12, such as that illustrated in FIG. 1. The tip 12 is moved into close proximity with the surface 14 being scanned by the atomic force microscope for non-contact interaction. The tip 12 is tapered so that the point of interaction with the surface 14 is well defined. As the distance "d" between the probe tip 12 and the surface 14 changes, the forces acting upon the probe 16 change correspondingly. The probe 16 is attracted and repelled by the surface 14 depending upon the interactive forces between the probe tip 12 and the surface 14.

The distance "d" between the surface and probe tip 12 changes either as a result of intentional movement of the probe 16 toward the surface 14 or as a result of changes in the surface typography as the probe 16 is scanned across the surface 14. As the tip 12 is scanned in the direction "x" over surface 14, the distance between the probe tip 12 and the surface 14 will change as the probe 16 is scanned over surface irregularities. As probe 16 passes over irregularities, the change in distance between the probe tip 12 and surface 14 will result in a change in the force between the probe 16 and the surface 14. This change in force will result in a deformation of the material 20 of probe 16 and therefore result in a change in the electrical characteristics of the material 20.

Material 20 can be a filament, of fine wire or piezo electric material, of finite length mounted at one end to a stationary surface 22 and having the probe tip 12 at the opposite end. Forces between the probe 12 and the surface 14 will be realized as an axial force on filament 20.

When the axial force acts to lengthen or shorten filament 20, its resistance is changed by ΔR. The resultant change in voltage is $i_o \Delta R$ which is a linear measure of the applied force. The force detection sensitivity necessary to detect a 3 Å step while scanning the probe of an Atomic Force Microscope (AFM) is determined as follows. Compensation must be made for the distortions introduced as a-function of noise, power and thermal dissipation requirements. In order to provide sufficient axial displacement to accurately measure changes in resistance, ΔR, of sufficient magnitude to distinguish such changes from background noises requires an extremely fine fiber strain gauge filament when measuring in a sensitivity range of a 3 Å step.

Figures 4A, 4B:
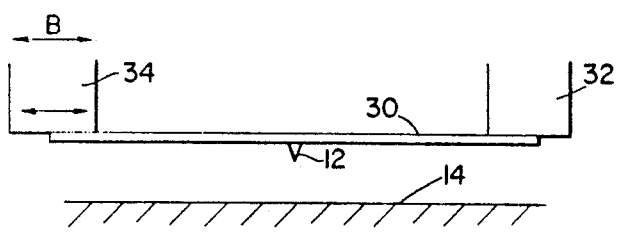
FIGS. 4A and 4B are side elevational views illustrating the relative positioning of a probe according to further alternative embodiments of the invention.

A second embodiment is also disclosed wherein the mounting filament 30 is configured in a bow-string configuration as illustrated in FIG. 4B. In this configuration, the forces applied between the sensor 12 and the surface 14 are amplified as distortions of the mounting filament 30. This configuration will tolerate a fiber of substantially larger diameter for the filament 30 and is preferred over the linear displacement embodiment of FIG. 1 in certain applications.

There are two techniques for detecting the forces acting on the probe tip 12 as a result of its proximity to a scanned surface 14. The first technique is the "force magnitude detection" technique wherein the change in force as the probe passes over a 3 Å atomic step is detected and measured. The second technique is "dither detection" wherein the change in the slope of the force-versus-distance-curve as the probe passes over an atomic step is detected and measured. The first technique is employed when the tip surface interactive force is measured and utilized to servo the probe position to maintain a constant probe/surface interactive force. The second technique is employed when the specimen 14 or the probe 12 is dithered in the direction perpendicular to the surface 14, and the resultant probe force modulation is measured with a lock-in detector system operating at the dither frequency. The second harmonic of the dither frequency will be a maximum when the probe is at the force minimum close to the specimen surface where the direction of the force is changing. This is a particularly desirable position for positioning the probe tip 12 in relation to the surface 14, since lateral resolution is high and the servo system does not have to tolerate a change in force direction as it approaches the surface. Each of these techniques is described in greater detail below.

With the linear strain gauge configuration illustrated in FIG. 1, the change in the longitudinal dimension Δl of the mounting filament 20 is measured by measuring the change in current flowing through the probe material 20. For semiconductor materials, such as p-type silicon fibers, ΔR/R is about 100×Δl/l (the "gauge factor").

If a p-type silicon with (III) axial orientation is utilized for the strain gauge material 20 with ρ=0.015 ohm Cm, the calculated change in resistance will be as follows:

$$\frac{\Delta R}{R_o} \approx 0.5 \times 10^{-5} S \qquad (1)$$

where $R_0$ is the initial resistance of the strain gauge 20, ΔR is the change in resistance, and S is the stress exerted linearly on the strain gauge measured in pounds per square inch (p.s.i.). Due to the magnitude of the change in resistance of material 20 as a result of the stress applied to the strain gauge 16, an extremely fine fiber is necessary for the sensor system to have a reasonable signal-to-noise ratio (S/N).

Similarly, an extremely fine fiber is necessary when a piezo electric material is utilized due to the force/deformation ratio provided by this configuration.

Figure 2:
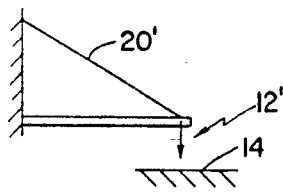
FIG. 2 is a side elevational view illustrating the relative positioning of a probe according to an alternative embodiment of the invention and a scanned surface.
Figure 3:
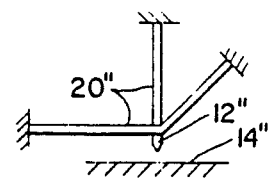
FIG. 3 is a side elevational view illustrating the relative positioning of a probe according to a further alternative embodiment of the invention.

FIGS. 2 and 3 illustrate alternate configurations for mounting of the strain gauge filaments 20' and 20" to improve the signal to noise ratio. In the embodiment illustrated in FIG. 2, the force between the sensor probe 12' and the surface 14 is able to exert a greater deforming force on the strain gauge filament 20' as a result of the leverage provided by the mounting embodiment illustrated. This greater deformation increases the change in electrical characteristics in response thereto, thereby raising the measured signal and improving the signal-to-noise ratio.

The embodiment illustrated in FIG. 3 utilizes three separate arms 20" of strain gauge material, thereby permitting force measurement in three dimensions. In this embodiment, the deformation of the two horizontal components will be greater than the deformation of the vertical component.

By mounting the probe tip 12 along the length of a horizontal strain gauge filament 30, as illustrated in FIG. 4A, a bow-string or amplified configuration is achieved. In this configuration, substantial variable mechanical gain can be provided to improve sensor sensitivity. One end of the strain gauge filament 30 is connected to a first fixed support 32 while the other end is attached to a second support 34 which is adjustable in the direction B along the length of the filament 30.

FIG. 4B illustrates a modification of the embodiment illustrated in FIG. 4A, wherein a second horizontal filament 31 is utilized to provide lateral stability to the probe 16, thereby preventing lateral displacement of the probe tip 12 as a result of interactive forces between the probe tip 12 and the surface 14. This embodiment of FIG. 4B provides a variable mechanical stress amplification of several orders of magnitude of the force exerted between the probe 16 and the surface 14. With this embodiment, electrical connections can be easily made to the filament 30; however, little separation between the sensor structure and the specimen surface 14 is provided.

According to the teachings of Y. Martin, C. C. Williams and H. K. Wickramasinghe, *Journal of Applied Physics*, 61, 4723 (1987) and the teachings of A. L. Wisenhorn, P. K. Hansma, T. R. Albrecht and C. F. Quate, copies of which are appended hereto and the disclosures of which are herein incorporated by reference, through extensive experimental studies of the forces exerted on an atomic force probe through surface interaction, an indication of the attractive probe forces when in close proximity to the surface in the order of magnitude of 10 Å distant is obtained.

Figure 15:
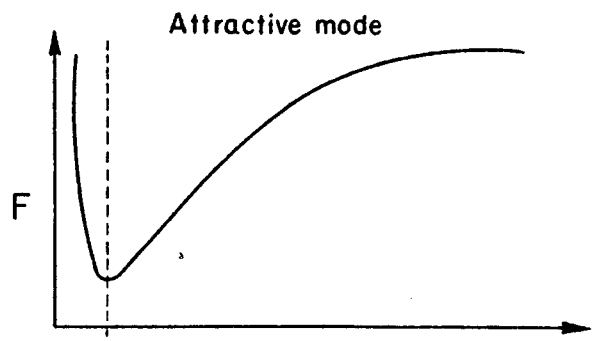
FIG. 15 is a graphical representation of the force between a probe and a surface.

According to the teachings cited above, the long distance attractive force between the probe and the surface is caused by dipole-dipole interaction and is called Van der Waals interaction, resulting in the right hand portion of the curve shown schematically in FIG. 15. A repulsive force between the probe and the surface occurs when the probe nears the surface. This short distance force is due to electron-electron interaction and results in the steeply rising curve on the left side of FIG. 15. It is customary to plot attractive forces negative in value when describing surface interactions.

These teachings have determined the magnitude of probe forces as follows:

$$\text{a maximum probe force of } \approx 4 \times 10^{-7} N \quad (2)$$

a maximum change in force with Z displacement of:

$$df/dz = f \approx 10 \ N/m = 0.10^{-9} \ N/\text{Å} \quad (3)$$

Solving for equation 3 the sensitivity required for force magnitude detection on an Å scale can be resolved.

Under the second dither technique, probe 16 of FIG. 1 interacts with an oscillating specimen surface 14 which oscillates in the z direction. It is possible to oscillate either the specimen 14 or the probe 16 in the z direction; however, for the embodiment described below, only the specimen 14 is oscillated. The oscillation is sinusoidal with an amplitude $dz = z_0 \sin \omega \tau$. The force on the probe is therefore calculated by the following equation:

$$F = \left.\frac{df}{dz}\right|_{zp} dz = z_0 \sin \omega\tau \left.\frac{df}{dz}\right|_{zp} \quad (4)$$

when $Z_0$ is $=3$ Å, the maximum dither force is:

$$F = 10\frac{N}{m} \cdot z_0 \sin \omega\tau \quad (5)$$

where $2z_0$ is the dither excursion.

Equation 5 illustrates the magnitude of the fluctuating force resulting from an incrementally small displacement along an essentially straight line instantaneous segment of the curve of FIG. 15. This sinusoidal displacement is a small fraction of the hundreds of Angstroms extent of the curve of FIG. 15.

The maximum force in FIG. 15 occurs at the minimum of the curve. The maximum in equation 3 occurs where the slope is greatest, to the right of the minimum. The high negative slope to the left of the minimum can be used for instrument control, but is seldom used because of the extreme proximity to the scanned surface. In an atomic force microscope, the probe is usually operated at the maximum slope or the force minimum, although any distance can be utilized.

Equations 2, 3, 4 and 5 depend upon the fundamental atomic properties of the surface atoms measured, including the probe surface, and the dimensions of the apex of the probe tip. Since the apex of the probe tip is normally held to atomic dimensions in order to achieve high resolution surface microtopography maps, and since the atomic forces of the materials used are very similar, the approximations of equations 2 and 3 are accepted by those skilled in the art.

The dither method is widely used in scientific and engineering measurements. An independent variable is changed in a time dependent manner, and the dependent variable is measured. This defines the slope of the functional relationship and lends itself to the use of high signal-to-noise detection systems, such as phase sensitive detectors and correlation based instruments. In the present case the spacing between the probe and the surface is oscillated in a sinusoidal manner, and the resulting force fluctuation vests itself as strain gauge fluctuations.

The dither force rapidly decreases from a maximum point to 0 as the probe approaches the force minimum illustrated in Graph I below. Therefore, the sensitivity requirement is approximately the same as the force magnitude required in equation 3 above when the probe is positioned near the force minimum. As the distance from the surface to the probe is increased, the change in the dither force with respect to the amplitude of the oscillation zp will be less than that utilizing the force magnitude method of dither detection.

The dither method has the advantage of utilizing a high frequency lock-in detection which enables easier minimization of $z_p$ drift, thus maintaining high resolution images.

By taking into consideration the various factors which affect strain gauge performance including the change in resistance as a function of total resistance and displacement, the noise inherent in a strain gauge resistor due to external thermal influences, the relationship of power dissipation to the signal-to-noise ratio of the strain gauge material and the heat transfer from the strain gauge fiber, the following Table I illustrating strain gauge parameters detecting a force of $3 \times 10^{-9}$ N, using a linear strain gauge system and utilizing a mechanical stress magnification factor of 100.

TABLE I

| Fiber Size | S (PSI) | $\Delta R/R_0$ | q $\Delta = 20°$ | Required Power for S/N = 1 | Power for S/N = 1 with 100X gain |
|---|---|---|---|---|---|
| 10 μ | 0.0054 | $2.7 \times 10^{-8}$ | $3.3 \times 10^{-6}$W | $2.3 \times 10^{-2}$W | $2.3 \times 10^{-6}$W |
| 3.1 μ | 0.054 | $2.7 \times 10^{-7}$ | $1.0 \times 10^{-6}$W | $2.3 \times 10^{-4}$ | $2.3 \times 10^{-8}$W |
| 1.0 μ | 0.54 | $2.7 \times 10^{-6}$ | $3.3 \times 10^{-7}$W | $2.3 \times 10^{-6}$ | $2.3 \times 10^{-10}$W |

It is very desirable from the standpoint of design construction and calibration to utilize a filament with a strain gauge which can be seen with an optical microscope. If the filament can be seen with an optical microscope, it can be manipulated with a much higher degree of competence. From Table I, it can be demonstrated that a signal-to-noise ratio=1 can easily be achieved with a linear strain gauge when a one micron fiber is utilized. However, if a force amplification of 100x is achieved using the "bow string" amplified sensor configuration illustrated in FIG. 4A, the power requirement, i.e. the last column of table 1, does not exceed the heat dissipation ability of a 10 micron fiber at T=20° C. Therefore, the bow string or amplified configuration is one of the preferred embodiments which allows for utilization of larger diameter, and therefore more easily manipulated filaments.

Through utilizing the amplified configuration as illustrated in FIG. 4A, and through resolution of the forces exerted on the filament as a result of the forces on the probe, and taking into consideration the resistance of the strain gauge material, it can be shown that a 3.1 diameter micron fiber sensor for an atomic force microscope is practical and can yield very satisfactory results when forces in the scale range experienced by atomic force microscopes are to be measured. Further, fibers up to 10 microns in diameter may prove satisfactory as illustrated in the above-referenced equations if the mechanical configuration is appropriate to yield satisfactory results from the equations.

Figure 5:
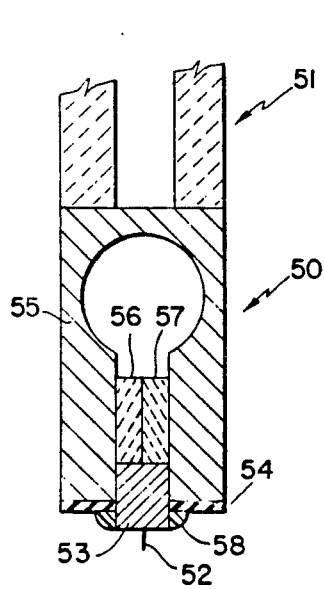
FIG. 5 is a detailed cross sectional view of the probe mounting according to an embodiment of the invention.

FIGS. 5-11 illustrate various embodiments for the mounting of a strain gauge filament and sensor tip to the end of a measuring instrument such as an atomic force microscope. FIG. 5 illustrates a variable tension strain gauge sensor 50 mounted on a xyz positioning apparatus 51. The sensor probe 52 is mounted to a strain gauge filament 53 which is epoxied to insulators 54 mounted on the free ends of a flexible core member 55. A pair of piezo ceramic disks 56 and 57 are provided to alter the tension on the strain gauge filament 53 thereby adjusting the mechanical gain as described above.

Figure 6:
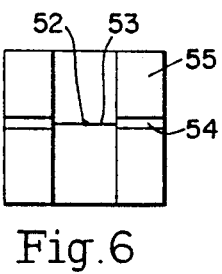
FIG. 6 is an end view of a probe mounting according to the invention.

FIG. 6 is an end view of the embodiment of FIG. 5 illustrating the attachment of the probe 52 and strain gauge filament 53 to the variable tension strain gauge configuration 50.

Figure 7:
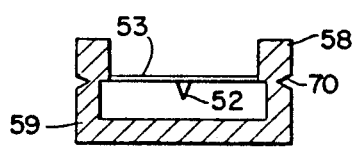
FIG. 7 is a cross sectional view of a probe tip and strain filament premounting configuration.

FIG. 7 illustrates one embodiment for prefabrication of the probe 52 and strain gauge filament 53 onto a base support member 58 which has a breakaway handle portion 59, through a microcircuit fabrication technique. Once the base elements 58 are epoxied to the insulating members 54 as illustrated in FIG. 5, the handle 59 is removed by breaking along fracture grooves 70. The handle 59 provides a convenient means for fabrication and handling of the strain filament and mounting components prior to final assembly. Handling of the strain filament 53 can be difficult due to the flexibility of the fine fiber material which needs to be utilized.

Figure 8:
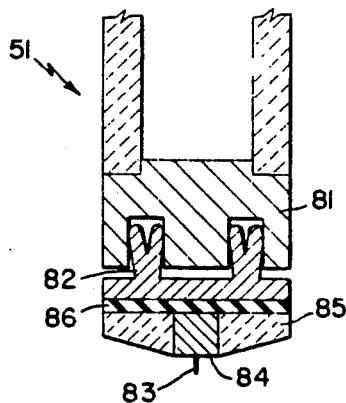
FIG. 8 is a detailed cross sectional view of the probe mounting according to an alternative embodiment of the invention.

The embodiment illustrated in FIG. 8 is similar in structure to the embodiment of FIG. 5; however, the method for mounting the strain gauge to the operational base 51, such as an atomic force microscope, is different. The base or instrument 51 is provided with an end member 81 which includes two openings for receipt of split posts 82 of the strain gauge mounting structure. Sensor tip 83 and strain filament 84 are mounted to invar posts 85 to which electrical connection is made to measure the change in resistance of filament 84. An insulating layer 86 is provided between the invar connecting posts 85 and the plug portion 82.

Figure 9:
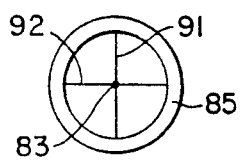
FIG. 9 is an end view of a probe mounting according to the invention.
Figure 10:
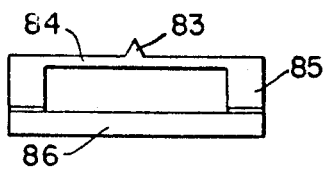
FIG. 10 is a side view of a probe tip and strain filament configuration.
Figure 11:
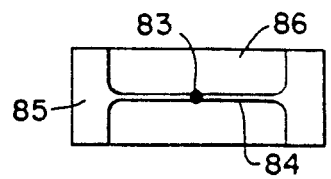
FIG. 11 is a end view of the probe tip and strain filament configuration of FIG. 10.

FIGS. 9, 10 and 11 illustrate two embodiments for the sensor structure of FIG. 8. In FIGS. 10 and 11, a probe 83 is formed on a single strain gauge material wire 84. The unit is fabricated from a single piece of silicon coated with appropriate materials, photolithographed, etched and shaped to produce the illustrated geometry forming a single strand strain gauge filament. The insulating base 86 is formed from the same silicon material as the posts 85, the filament 84 and sensor tip 83, except that member 84 is rendered conductive by the inward diffusion of a suitable dopant. In one embodiment, the tip 83 is approximately four microns in length, while the filament 84 is approximately three microns in diameter and approximately 20 mils long or 500 microns. The silicon base can have a resistance in the order of magnitude of 0.01 Ω and is approximately one-to-two mils in height. The insulating layer 86 can be of appropriate insulating material.

FIG. 9 illustrates an alternate embodiment where two crossed strain gauge filaments 91 and 92 are utilized. The use of crossed filaments provides additional lateral rigidity to the probe tip 83, thereby significantly reducing twisting of the strain gauge material due to lateral forces on the probe 83.

Figure 12:
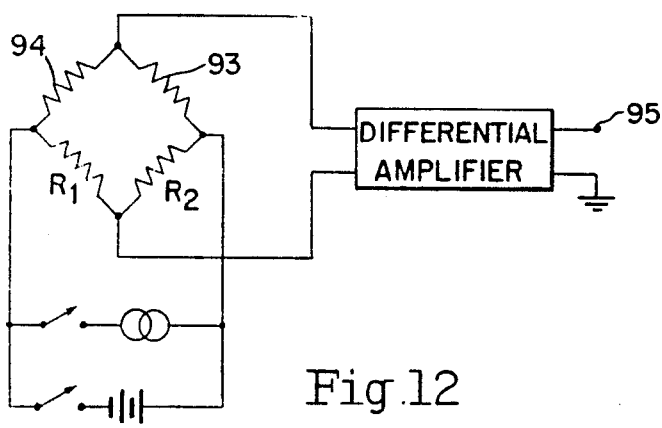
FIG. 12 is a schematic diagram of the circuit for measuring the resistive changes in a wire strain gauge material.

FIG. 12 illustrates a configuration for measurement of the changes in resistance in the strain gauge or sensor wire. In the embodiment illustrated in FIG. 12, the strain gauge wire 93 forms a portion of a bridge circuit along with matching wire 94 and resistors R1 and R2.

Either alternating or direct circuit can be supplied to the bridge circuit. When the resistance of gauge wire 93 changes, the balance of the bridge is altered, thereby altering the input to the differential amplifier. The output of the differential amplifier is sensed at output terminal 95. Monitoring of the sensed output at terminal 95 provides an indication of the change in resistance of strain gauge wire 93.

Figure 13:
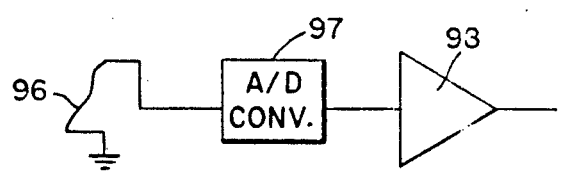
FIG. 13 is a block diagram of the circuit for measuring the resistive changes in a piezo electric strain gauge material.

FIG. 13 provides a block diagram illustrating the one embodiment for monitoring of the voltages generated by deformations of piezo electric material utilized as a strain filament. Connections are made to the filament 96 and the analog voltage signal sensed therefrom is first converted to a digital signal in A/D converter 97 and the passed to amplifier 98. The output of which is monitored to track the voltage output from the filament 96.

Figure 14:
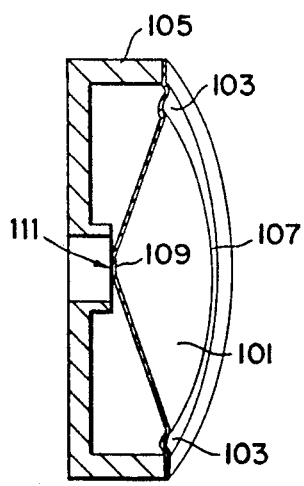
FIG. 14 is a cross-sectional perspective view of an embodiment of the present invention utilized for pressure sensing.

The strain gauge of the present invention has been described in the context of a point force sensor above, other applications for the structure taught herein, such as the high sensitivity microphone illustrated in FIG. 14, can be implemented without departing from the scope and spirit of the invention. The physical characteristics of the strain filament 30, as illustrated in FIGS. 4A and 4B, are applicable to alternative implementations.

The sensor illustrated in FIG. 14 is sensitive to pressure fluctuations on the surface of cone 101 which is resiliently mounted at 103 to a supporting structure 105 about its rim 107. The apex 109 of the cone contacts the strain gauge filament 111 along its length between its connections to the support structure 105. Changes in pressure experienced on one surface of the cone 101 will cause a corresponding deformation of the strain filament 111 which can be measured as described above, to determine the magnitude of the pressure force on the surface of the cone 101.

The filament 111 is lightly bias preloaded by pressure from the cone 101 in order to prevent rectification of the pressure waves sensed by the cone 101. It is not necessary to bias the filament in each application of the present invention, such as the non-contact point force sensor application described above, where the attraction between the probe and the sensed surface act to avoid rectification.

If the cone 101 and resilient mounting 103 are properly selected for sensitivity to audible sound waves, the structure illustrated in FIG. 14 can be utilized as a high sensitivity microphone. Proper construction of the cone 101 and resilient mounting 103 can be designed to provide responsiveness to pressure changes tuned to the phenomenon to be monitored, such as barometric changes or controlled pressure chamber fluctuations.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A point force sensor for measuring relative forces between a probe and an object, comprising:

a probe having a tip for non-contact interaction with a first surface of said sensed object, and having a strain sensitive portion for deforming in response to said interaction between said tip and said surface, said strain sensitive portion including a first elongate member oriented essentially parallel to said first surface and exhibiting a change in electrical characteristics proportionate to changes in physical characteristics;

means for monitoring the electrical characteristics of said probe;

positioning means for positioning said probe with respect to said first surface; and adjustable tensioning means for adjustable tensioned mounting of said first elongate member to said positioning means.

2. A point force sensor according to claim 1, wherein:
   said elongate member includes a first strain gauge fiber having first and second ends connected to said tensioned mounting means, said probe being connected to said fiber at a first location between said first and second ends.

3. A point force sensor according to claim 2, further including:

a second strain gauge fiber tensionally mounted to said positioning means, connected to said sensor means and said first fiber at said first location, and crossing said first fiber at a transverse angle.

4. A point force sensor for measuring relative forces between a probe and an object, comprising:

a probe having a tip for non-contact interaction with a first surface of said sensed object, and having a strain sensitive portion for deforming in response to said interaction between said tip and said surface, said strain sensitive portion exhibiting a change in electrical characteristics proportionate to changes in physical characteristics, and means for monitoring the electrical characteristics of said probe;

wherein said strain sensitive portion includes:

a first elongate member with a first end secured to a first mounting means and a second end secured to a second mounting means, said probe tip being mounted along said elongate member between said first and second mounting means, said sensor further comprising:

means for changing the distance between said first and second mounting means.

5. In an atomic force microscope for scanning a surface with a non-contact interactive probe having a proximity force receiving tip, said microscope having means for positioning said tip within a desired distance range from said surface, and means for scanning said probe across said surface, the improvement wherein said probe comprises:

an electrically conductive strain gauge fiber which deforms proportionate to the force experienced between said probe and said surface, and exhibits a change in its electrical characteristics in proportion to said deformation, and means for monitoring the electrical characteristics of said fiber.

* * * * *